(12) United States Patent
Ishisaka et al.

(10) Patent No.: US 8,161,485 B2
(45) Date of Patent: Apr. 17, 2012

(54) SCHEDULING JOBS IN A PLURALITY OF QUEUES AND DIVIDING JOBS INTO HIGH AND NORMAL PRIORITY AND CALCULATING A QUEUE SELECTION REFERENCE VALUE

(75) Inventors: Akira Ishisaka, Kawasaki (JP); Naoya Teshima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1180 days.

(21) Appl. No.: 11/905,355

(22) Filed: Sep. 28, 2007

(65) Prior Publication Data

US 2008/0127193 A1  May 29, 2008

(30) Foreign Application Priority Data

Sep. 29, 2006 (JP) .................................. 2006-269082

(51) Int. Cl.
*G06F 9/46* (2006.01)
(52) U.S. Cl. ...................................................... 718/103
(58) Field of Classification Search ................... 718/103
See application file for complete search history.

(56) References Cited

U.S. PATENT DOCUMENTS

| 5,715,457 | A | | 2/1998 | Wakatani |
| 6,047,045 | A | * | 4/2000 | Bauer et al. ............... 379/26.01 |
| 6,205,150 | B1 | * | 3/2001 | Ruszczyk ..................... 370/412 |
| 6,272,606 | B1 | | 8/2001 | Dorricott et al. |
| 7,069,559 | B2 | * | 6/2006 | Janssen et al. ................ 719/314 |

FOREIGN PATENT DOCUMENTS

| JP | 03-19035 | 1/1991 |
| JP | 04-147344 | 5/1992 |
| JP | 08-055091 | 2/1996 |
| JP | 9-160890 | 6/1997 |
| JP | 09-265459 | 10/1997 |
| JP | 10-283200 | 10/1998 |

OTHER PUBLICATIONS

Japanese Office Action mailed Sep. 14, 2010 in respect to Japanese Patent Application No. 2006-269082.

* cited by examiner

*Primary Examiner* — Meng An
*Assistant Examiner* — Wissam Rashid
(74) *Attorney, Agent, or Firm* — Staas & Halsey LLP

(57) ABSTRACT

A scheduling method for inputting jobs into queues provided for each of a plurality of information processing devices in a distributed processing system includes inputting jobs into each queue. A queue selection reference value is calculated for each queue, based on a predicted time at which processing of a job in execution in each information processing device is finished and a predicted time necessary for executing processing on high priority jobs input into the queue associated with the corresponding information processing device. A target job which was input into the corresponding queue at the earliest time is extracted from among the normal jobs input into all the queues. The target job is shifted to the queue having the smallest queue selection reference value. A new queue selection reference value of the queue to which the target job is shifted is calculated on the basis of a predicted time necessary for executing processing on the target job. Finally, a new target job is extracted.

7 Claims, 15 Drawing Sheets

FIG. 4C

NORMAL JOB EXECUTION WAIT LIST

| JOB NAME | AREA | PRIORITY | INPUT TIME AND DATE | STATE | QUEUE |
|---|---|---|---|---|---|
| JOB 4 | COMPANY-WIDE | INTER-MEDIATE | 10:04 SEP. 1 2006 | WAIT | QUEUE #1 |
| JOB 7 | SECTION X | INTER-MEDIATE | 10:07 SEP. 1 2006 | WAIT | QUEUE #1 |
| JOB 10 | COMPANY-WIDE | INTER-MEDIATE | 10:10 SEP. 1 2006 | WAIT | QUEUE #1 |
| JOB 13 | SECTION X | INTER-MEDIATE | 10:13 SEP. 1 2006 | WAIT | QUEUE #1 |
| JOB 5 | SECTION X | INTER-MEDIATE | 10:05 SEP. 1 2006 | WAIT | QUEUE #2 |
| JOB 8 | COMPANY-WIDE | INTER-MEDIATE | 10:08 SEP. 1 2006 | WAIT | QUEUE #2 |
| JOB 11 | SECTION X | INTER-MEDIATE | 10:11 SEP. 1 2006 | WAIT | QUEUE #2 |
| JOB 14 | COMPANY-WIDE | INTER-MEDIATE | 10:14 SEP. 1 2006 | WAIT | QUEUE #2 |
| JOB 6 | COMPANY-WIDE | INTER-MEDIATE | 10:06 SEP. 1 2006 | WAIT | QUEUE #3 |
| JOB 9 | SECTION Y | INTER-MEDIATE | 10:09 SEP. 1 2006 | WAIT | QUEUE #3 |
| JOB 12 | COMPANY-WIDE | INTER-MEDIATE | 10:12 SEP. 1 2006 | WAIT | QUEUE #3 |
| JOB 15 | COMPANY-WIDE | INTER-MEDIATE | 10:15 SEP. 1 2006 | WAIT | QUEUE #3 |

NORMAL JOB EXECUTION WAIT INPUT ORDER LIST

| JOB NAME | AREA | PRIORITY | INPUT TIME AND DATE | STATE | QUEUE |
|---|---|---|---|---|---|
| JOB 4 | COMPANY-WIDE | INTER-MEDIATE | 10:04 SEP. 1 2006 | WAIT | QUEUE #1 |
| JOB 5 | SECTION X | INTER-MEDIATE | 10:05 SEP. 1 2006 | WAIT | QUEUE #2 |
| JOB 6 | COMPANY-WIDE | INTER-MEDIATE | 10:06 SEP. 1 2006 | WAIT | QUEUE #3 |
| JOB 7 | SECTION X | INTER-MEDIATE | 10:07 SEP. 1 2006 | WAIT | QUEUE #1 |
| JOB 8 | COMPANY-WIDE | INTER-MEDIATE | 10:08 SEP. 1 2006 | WAIT | QUEUE #2 |
| JOB 9 | SECTION Y | INTER-MEDIATE | 10:09 SEP. 1 2006 | WAIT | QUEUE #3 |
| JOB 10 | COMPANY-WIDE | INTER-MEDIATE | 10:10 SEP. 1 2006 | WAIT | QUEUE #1 |
| JOB 11 | SECTION X | INTER-MEDIATE | 10:11 SEP. 1 2006 | WAIT | QUEUE #2 |
| JOB 12 | COMPANY-WIDE | INTER-MEDIATE | 10:12 SEP. 1 2006 | WAIT | QUEUE #3 |
| JOB 13 | SECTION X | INTER-MEDIATE | 10:13 SEP. 1 2006 | WAIT | QUEUE #1 |
| JOB 14 | COMPANY-WIDE | INTER-MEDIATE | 10:14 SEP. 1 2006 | WAIT | QUEUE #2 |
| JOB 15 | COMPANY-WIDE | INTER-MEDIATE | 10:15 SEP. 1 2006 | WAIT | QUEUE #3 |

| JOB NAME | QUEUE | TIME ELAPSED |
|---|---|---|
| JOB 1 | QUEUE #1 | 600 SECONDS |
| JOB 2 | QUEUE #2 | 540 SECONDS |
| JOB 3 | QUEUE #3 | 480 SECONDS |

| JOB NAME | QUEUE | REMAINING TIME |
|---|---|---|
| JOB 1 | QUEUE #1 | 3000 SECONDS |
| JOB 2 | QUEUE #2 | 3060 SECONDS |
| JOB 3 | QUEUE #3 | 3120 SECONDS |

| QUEUE | NUMBER OF MACHINE SPECIFIED JOBS |
|---|---|
| QUEUE #1 | 0 |
| QUEUE #2 | 3 |
| QUEUE #3 | 0 |

QUEUE SELECTION REFERENCE VALUE

| QUEUE NAME | REFERENCE VALUE |
|---|---|
| QUEUE #1 | 3000 |
| QUEUE #2 | 13860 |
| QUEUE #3 | 3120 |

FIG. 5

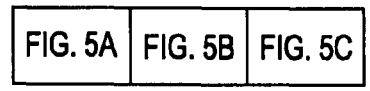

FIG. 5A

NORMAL JOB EXECUTION WAIT INPUT ORDER LIST

| JOB NAME | AREA | PRIORITY | INPUT TIME AND DATE | STATE | QUEUE |
|---|---|---|---|---|---|
| JOB 4 | COMPANY-WIDE | INTER-MEDIATE | 10:04 SEP. 1 2006 | WAIT | QUEUE #1 |
| JOB 5 | SECTION X | INTER-MEDIATE | 10:05 SEP. 1 2006 | WAIT | QUEUE #2 |
| JOB 6 | COMPANY-WIDE | INTER-MEDIATE | 10:06 SEP. 1 2006 | WAIT | QUEUE #3 |
| JOB 7 | SECTION X | INTER-MEDIATE | 10:07 SEP. 1 2006 | WAIT | QUEUE #1 |
| JOB 8 | COMPANY-WIDE | INTER-MEDIATE | 10:08 SEP. 1 2006 | WAIT | QUEUE #2 |
| JOB 9 | SECTION Y | INTER-MEDIATE | 10:09 SEP. 1 2006 | WAIT | QUEUE #3 |
| JOB 10 | COMPANY-WIDE | INTER-MEDIATE | 10:10 SEP. 1 2006 | WAIT | QUEUE #1 |
| JOB 11 | SECTION X | INTER-MEDIATE | 10:11 SEP. 1 2006 | WAIT | QUEUE #2 |
| JOB 12 | COMPANY-WIDE | INTER-MEDIATE | 10:12 SEP. 1 2006 | WAIT | QUEUE #3 |
| JOB 13 | SECTION X | INTER-MEDIATE | 10:13 SEP. 1 2006 | WAIT | QUEUE #1 |
| JOB 14 | COMPANY-WIDE | INTER-MEDIATE | 10:14 SEP. 1 2006 | WAIT | QUEUE #2 |
| JOB 15 | COMPANY-WIDE | INTER-MEDIATE | 10:15 SEP. 1 2006 | WAIT | QUEUE #3 |

→ (21)

QUEUE SELECTION REFERENCE VALUE

| QUEUE NAME | REFERENCE VALUE |
|---|---|
| QUEUE #1 | 3000 |
| QUEUE #2 | 13860 |
| QUEUE #3 | 3120 |

→ (22)

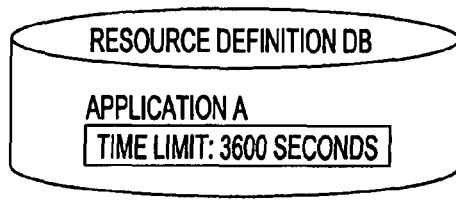

→ (23)

QUEUE SELECTION REFERENCE VALUE

| QUEUE NAME | REFERENCE VALUE |
|---|---|
| QUEUE #1 | 6600 |
| QUEUE #2 | 13860 |
| QUEUE #3 | 3120 |

| FIG. 6A | FIG. 6B |

FIG. 6A

NORMAL JOB EXECUTION WAIT INPUT ORDER LIST

| JOB NAME | AREA | PRIORITY | INPUT TIME AND DATE | STATE | QUEUE |
|---|---|---|---|---|---|
| JOB 4 | COMPANY-WIDE | INTER-MEDIATE | 10:04 SEP. 1 2006 | WAIT | QUEUE #1 |
| JOB 5 | SECTION X | INTER-MEDIATE | 10:05 SEP. 1 2006 | WAIT | QUEUE #2 |
| JOB 6 | COMPANY-WIDE | INTER-MEDIATE | 10:06 SEP. 1 2006 | WAIT | QUEUE #3 |
| JOB 7 | SECTION X | INTER-MEDIATE | 10:07 SEP. 1 2006 | WAIT | QUEUE #1 |
| JOB 8 | COMPANY-WIDE | INTER-MEDIATE | 10:08 SEP. 1 2006 | WAIT | QUEUE #2 |
| JOB 9 | SECTION Y | INTER-MEDIATE | 10:09 SEP. 1 2006 | WAIT | QUEUE #3 |
| JOB 10 | COMPANY-WIDE | INTER-MEDIATE | 10:10 SEP. 1 2006 | WAIT | QUEUE #1 |
| JOB 11 | SECTION X | INTER-MEDIATE | 10:11 SEP. 1 2006 | WAIT | QUEUE #2 |
| JOB 12 | COMPANY-WIDE | INTER-MEDIATE | 10:12 SEP. 1 2006 | WAIT | QUEUE #3 |
| JOB 13 | SECTION X | INTER-MEDIATE | 10:13 SEP. 1 2006 | WAIT | QUEUE #1 |
| JOB 14 | COMPANY-WIDE | INTER-MEDIATE | 10:14 SEP. 1 2006 | WAIT | QUEUE #2 |
| JOB 15 | COMPANY-WIDE | INTER-MEDIATE | 10:15 SEP. 1 2006 | WAIT | QUEUE #3 |

→ (27)

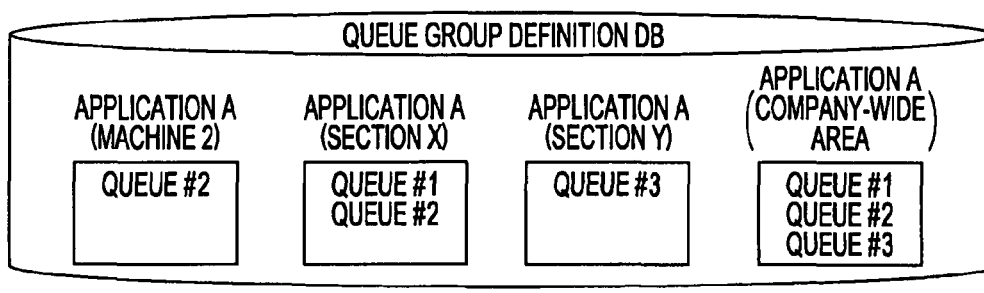

QUEUE GROUP DEFINITION DB

| APPLICATION A (MACHINE 2) | APPLICATION A (SECTION X) | APPLICATION A (SECTION Y) | APPLICATION A (COMPANY-WIDE AREA) |
|---|---|---|---|
| QUEUE #2 | QUEUE #1<br>QUEUE #2 | QUEUE #3 | QUEUE #1<br>QUEUE #2<br>QUEUE #3 |

→ (28)

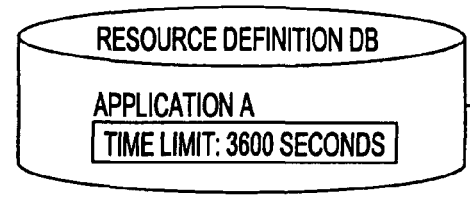

RESOURCE DEFINITION DB

APPLICATION A
TIME LIMIT: 3600 SECONDS

| FIG. 7A | FIG. 7B |

FIG. 7A

NORMAL JOB EXECUTION WAIT INPUT ORDER LIST

| JOB NAME | AREA | PRIORITY | INPUT TIME AND DATE | STATE | QUEUE |
|---|---|---|---|---|---|
| JOB 4 | COMPANY-WIDE | INTER-MEDIATE | 10:04 SEP. 1 2006 | WAIT | QUEUE #1 |
| JOB 5 | SECTION X | INTER-MEDIATE | 10:05 SEP. 1 2006 | WAIT | QUEUE #2 |
| JOB 6 | COMPANY-WIDE | INTER-MEDIATE | 10:06 SEP. 1 2006 | WAIT | QUEUE #3 |
| JOB 7 | SECTION X | INTER-MEDIATE | 10:07 SEP. 1 2006 | WAIT | QUEUE #1 |
| JOB 8 | COMPANY-WIDE | INTER-MEDIATE | 10:08 SEP. 1 2006 | WAIT | QUEUE #2 |
| JOB 9 | SECTION Y | INTER-MEDIATE | 10:09 SEP. 1 2006 | WAIT | QUEUE #3 |
| JOB 10 | COMPANY-WIDE | INTER-MEDIATE | 10:10 SEP. 1 2006 | WAIT | QUEUE #1 |
| JOB 11 | SECTION X | INTER-MEDIATE | 10:11 SEP. 1 2006 | WAIT | QUEUE #2 |
| JOB 12 | COMPANY-WIDE | INTER-MEDIATE | 10:12 SEP. 1 2006 | WAIT | QUEUE #3 |
| JOB 13 | SECTION X | INTER-MEDIATE | 10:13 SEP. 1 2006 | WAIT | QUEUE #1 |
| JOB 14 | COMPANY-WIDE | INTER-MEDIATE | 10:14 SEP. 1 2006 | WAIT | QUEUE #2 |
| JOB 15 | COMPANY-WIDE | INTER-MEDIATE | 10:15 SEP. 1 2006 | WAIT | QUEUE #3 |

→ 30

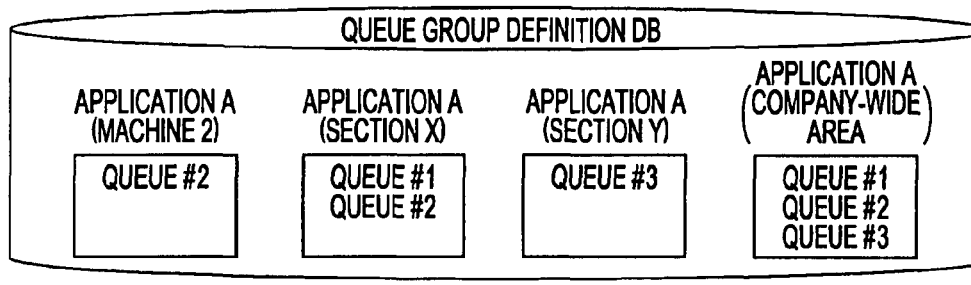

→ 31

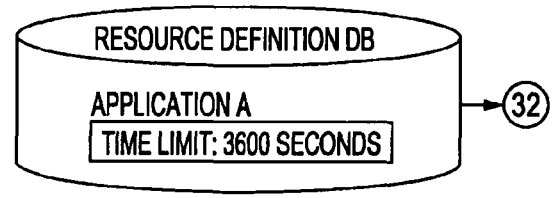

QUEUE STATUS DB

QUEUE #1

| JOB NAME | AREA | PRIORITY | INPUT TIME AND DATE | STATE | TIME ELAPSED |
|---|---|---|---|---|---|
| JOB 1 | COMPANY-WIDE | INTER-MEDIATE | 10:01 SEP. 1 2006 | ACTIVE | 600 SECONDS |
| JOB 4 | COMPANY-WIDE | INTER-MEDIATE | 10:04 SEP. 1 2006 | WAIT | – |
| JOB 5 | SECTION X | INTER-MEDIATE | 10:05 SEP. 1 2006 | WAIT | – |
| JOB 7 | SECTION X | INTER-MEDIATE | 10:07 SEP. 1 2006 | WAIT | – |
| JOB 10 | COMPANY-WIDE | INTER-MEDIATE | 10:10 SEP. 1 2006 | WAIT | – |
| JOB 13 | SECTION X | INTER-MEDIATE | 10:13 SEP. 1 2006 | WAIT | – |

QUEUE #2

| JOB NAME | AREA | PRIORITY | INPUT TIME AND DATE | STATE | TIME ELAPSED |
|---|---|---|---|---|---|
| JOB 2 | COMPANY-WIDE | INTER-MEDIATE | 10:02 SEP. 1 2006 | ACTIVE | 540 SECONDS |
| JOB A | MACHINE 2 | HIGH | | WAIT | – |
| JOB B | MACHINE 2 | HIGH | | WAIT | – |
| JOB C | MACHINE 2 | HIGH | | WAIT | – |
| JOB 11 | SECTION X | INTER-MEDIATE | 10:11 SEP. 1 2006 | WAIT | – |
| JOB 14 | COMPANY-WIDE | INTER-MEDIATE | 10:14 SEP. 1 2006 | WAIT | – |

QUEUE #3

| JOB NAME | AREA | PRIORITY | INPUT TIME AND DATE | STATE | TIME ELAPSED |
|---|---|---|---|---|---|
| JOB 3 | COMPANY-WIDE | INTER-MEDIATE | 10:01 SEP. 1 2006 | ACTIVE | 480 SECONDS |
| JOB 6 | COMPANY-WIDE | INTER-MEDIATE | 10:06 SEP. 1 2006 | WAIT | – |
| JOB 8 | COMPANY-WIDE | INTER-MEDIATE | 10:08 SEP. 1 2006 | WAIT | – |
| JOB 9 | SECTION Y | INTER-MEDIATE | 10:09 SEP. 1 2006 | WAIT | – |
| JOB 12 | COMPANY-WIDE | INTER-MEDIATE | 10:12 SEP. 1 2006 | WAIT | – |
| JOB 15 | COMPANY-WIDE | INTER-MEDIATE | 10:15 SEP. 1 2006 | WAIT | – |

SCHEDULING JOBS IN A PLURALITY OF QUEUES AND DIVIDING JOBS INTO HIGH AND NORMAL PRIORITY AND CALCULATING A QUEUE SELECTION REFERENCE VALUE

BACKGROUND OF THE INVENTION

A grid computing system using information processing apparatuses (hereinafter referred to as "machines"), is now being considered in order to make the best use of the machines. The machines might be, for example, personal computers, which are located in a company in a distributed manner and are in the idle state.

A queue is set for each machine in the grid computing system. If a job having a high priority level is input into the queue corresponding to a certain machine, however, a job that has already been input into the same queue enters the standby state. The job in the standby state may be executed later than jobs that were input into the queue at a later time.

SUMMARY OF THE INVENTION

According to an aspect of an embodiment of the present invention, there is provided a scheduling method for allowing a computer to perform control for inputting jobs into each queue, the queue being provided for each of a plurality of information processing devices in a distributed processing system. The scheduling method includes a first step of inputting jobs into each queue by dividing the jobs into high priority jobs which are preferentially processed in each information processing device, and normal jobs which do not have to be preferentially processed, a second step of calculating a queue selection reference value of each queue, which corresponds to each unit of information processing, on the basis of a predicted time at which processing of a job in execution in each information processing device is finished and a predicted time necessary for executing processing on high priority jobs input into the queue associated with the corresponding information processing device, a third step of extracting as a target job, among the normal jobs input into all the queues, a normal job which was input into the corresponding queue at the earliest time, a fourth step of shifting the target job to the queue having the smallest queue selection reference value and also of calculating a new queue selection reference value of the queue to which the target job is shifted on the basis of a predicted time necessary for executing processing on the target job, and a fifth step of extracting, as a new target job, a normal job which was input into the corresponding queue at the second earliest time after the target job in the fourth step and of executing the fourth step by using the new target job.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 6A through 7B illustrate a specific example of normal job equalizing processing; and FIG. 8 illustrates a result of executing normal job equalizing processing.

DETAILED DESCRIPTION OF THE PREFERRED EMBODIMENTS

I. Overview of Embodiment

An overview of an embodiment of the present invention is described below with reference to FIG. 1.

In this embodiment, the following usage model, for example, is assumed.

A machine that executes jobs requiring large-scale computing is specified. The jobs for which a machine executing special processing is specified are referred to as "machine specified jobs".

No machines are specified for normal jobs (jobs without a high priority level). Such jobs are input into the queue corresponding to any machine or into a queue of a specified section group.

A machine specified job is a job to be executed by using a specified machine. Since not many execution environments can be chosen for a machine specified job, it is not preferable that such a machine specified job has to enter the standby state under the same condition as that for normal jobs. Accordingly, a high priority level is given to machine specified jobs.

If a machine specified job is input into a queue so that it can be preferentially executed, as stated above, normal jobs waiting in the same queue have to be interrupted every time a machine specified job is input.

Accordingly, adjustments are made so that normal jobs are executed in the order in which they are input into queues. The adjustments are made on the basis of the allocation of machine specified jobs having a high priority level, and the execution wait states of queues (predictions about when the execution of active jobs is to be finished), as shown in FIG. 1.

Figure 1:
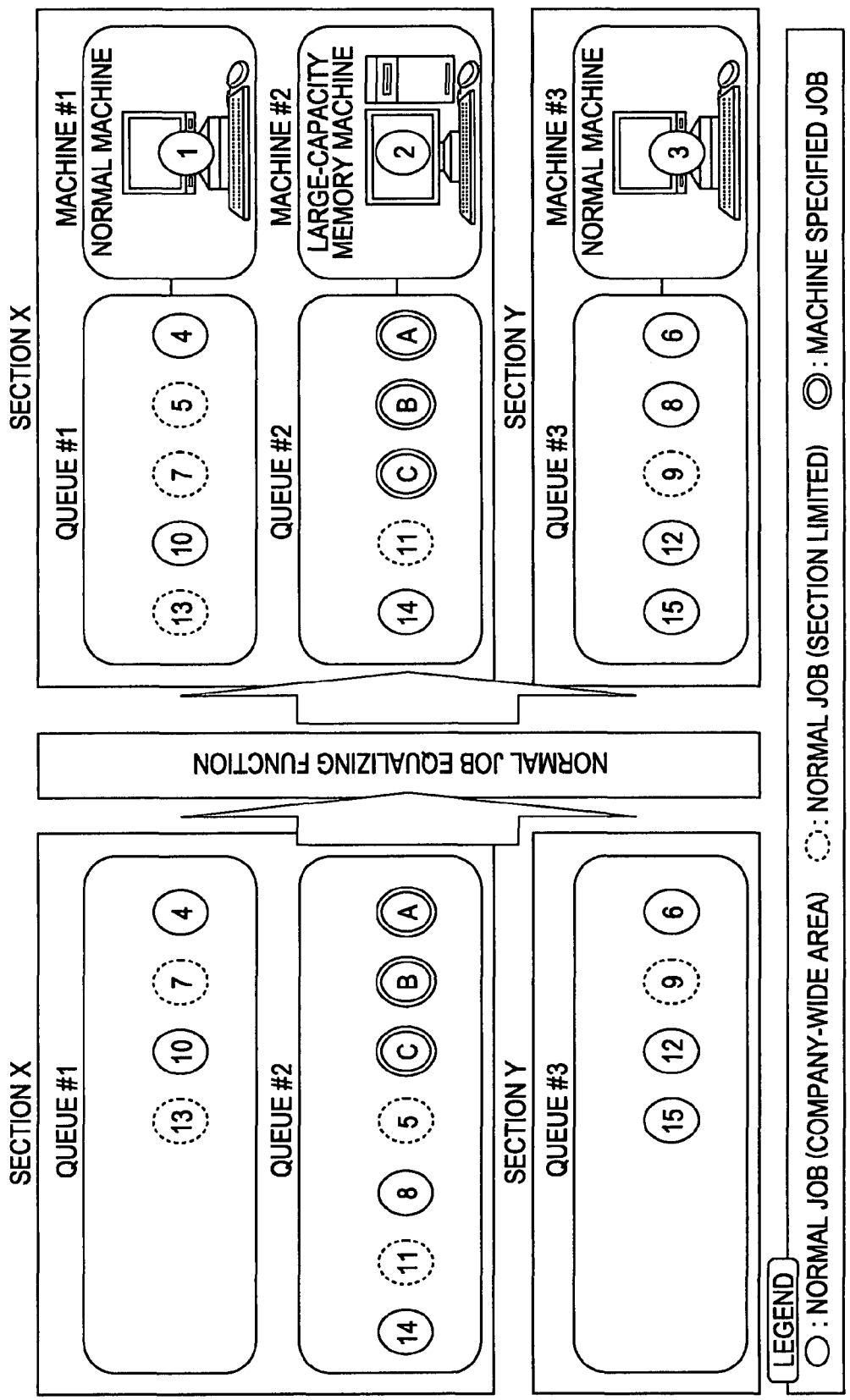
FIG. 1 illustrates the concept of an embodiment of the present invention.

Jobs in the execution wait state in each queue are shown in FIG. 1. Jobs before equalizing processing by executing an equalizing function has been performed are shown at the left side of FIG. 1. The state after the equalizing processing has been performed for normal jobs is shown at the right side of FIG. 1.

More specifically, since job A, job B, and job C, which are machine specified jobs having a high priority level, are already input into queue #2 associated with machine #2, normal jobs 5, 8, 11, and 14 would have to wait longer than those input into the other queues, before the equalizing processing is executed for normal jobs. By executing the equalizing function in this state, adjustments are made so that normal jobs can be executed in the order in which they are input.

II. System Configuration According to Embodiment of the Present Invention

The system configuration in accordance with an embodiment of the present invention is described below with reference to the block diagram of FIG. 2.

Figure 2:
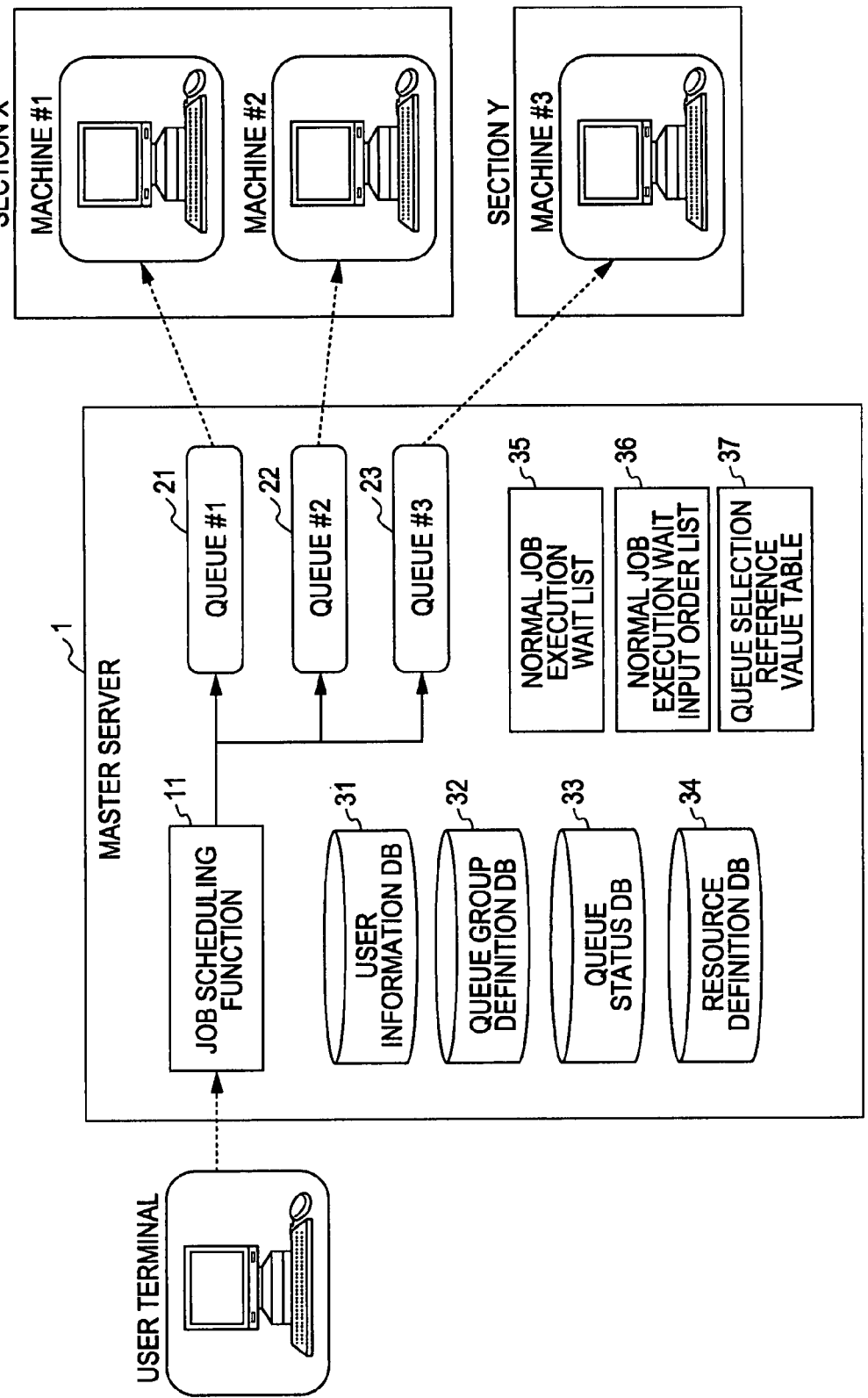
FIG. 2 is a block diagram illustrating the system configuration of an embodiment of the present invention.

In FIG. 2, there is shown a master server 1 that performs job scheduling in accordance with this embodiment. The master server 1 includes the following hardware elements: a processor executing processing described below; programs for operating the processor, various tables (lists) and databases (hereinafter databases are abbreviated as "DB" in the following description and also in the drawings); storage means (such as a semiconductor memory or a hard disk drive) for storing information concerning jobs input into queues; and communication means for accessing a network to receive jobs from a user terminal executing an application or to send jobs input into queues and allow machines to execute the corresponding jobs.

In the master server 1 having the above-described hardware configuration, a job scheduling function 11 inputs jobs received from the user terminal into queue #1 (21), queue #2 (22), and queue #3 (23), which are associated with machine #1, machine #2, and machine #3, respectively. The job scheduling function 11 includes a job equalizing function to perform equalizing processing for jobs input into the queues.

The master server 1 includes databases, such as a user information DB 31, a queue group definition DB 32, a queue status DB 33, and a resource definition DB 34, to allow the job scheduling function 11 to input jobs and perform equalization processing for jobs. The master server 1 also includes a normal job execution wait list 35, a normal job execution wait input order list 36, and a queue selection reference value table 37. The specific configurations of the DBs and tables are discussed below. It is not necessary that the DBs and tables be physically constructed on the storage means of the master server 1. Alternatively, they may be constructed on another hardware resource that can be easily accessed by the master server 1.

Only three queues, such as queue #1 through queue #3, are shown in FIG. 2. The three queues are associated with three machines that can execute application A, which is discussed below. If the execution of jobs concerning a plurality of applications is requested, such jobs are input into machines associated with the corresponding applications, though such a state is not shown in FIG. 2.

A description is now given of job input processing and job equalizing processing in the above-configured system.

III. Job Input Processing

Examples of job input commands are as follows:

qsub-q queue name [-m machine name] [-local] execution batch file.

Options provided for a job input command instruction qsub are as follows:

-q: specifying an application name as a queue name;

-m: specifying a machine that executes a job (if this option is specified, the job is executed only by a specified computing server; and -local: if a job is executed by machines only in a local section in which those machines are installed, this option is specified.

A local section to execute processing is specified because of the following reason. Each machine executes corresponding jobs by accessing information resources, such as DBs, provided for a local section in which the machine is installed. Accessing local information resources reduces network traffic, compared with a case where the jobs are executed by a machine installed in another section.

Job input control processing performed by the master server 1 when being requested to input jobs is described below with reference to the flowchart in FIGS. 3A and 3B.

Figures 3, 3A:
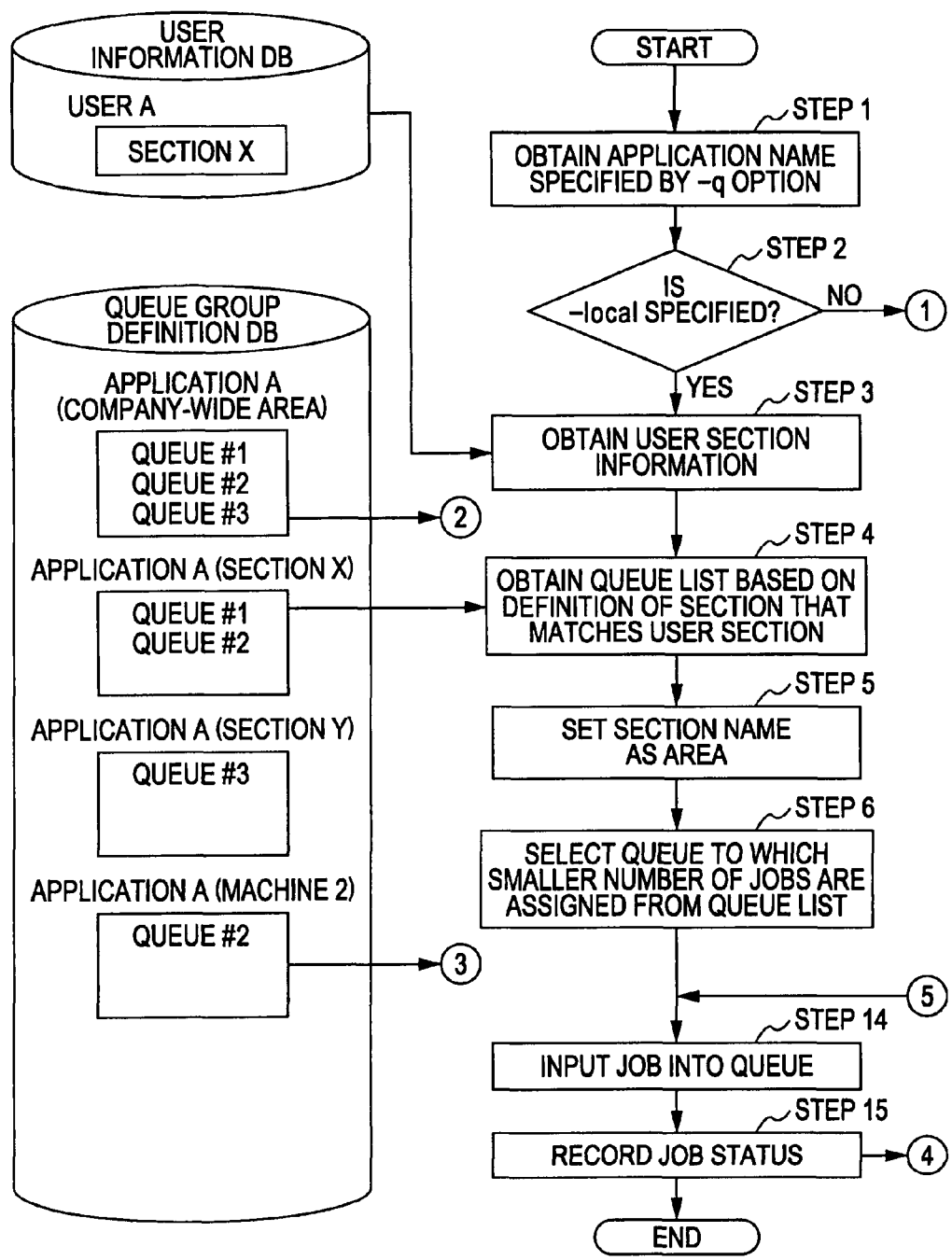
FIGS. 3A and 3B are a flowchart illustrating job input processing.

Reference is first made to FIG. 3A. In STEP 1, an application name specified by the -q option of a job input command sequence is obtained.

In STEP 2, it is analyzed whether the -local option is specified in the job input command sequence, and if it is specified, STEP 3 through STEP 6 are executed. If the -local option is not specified, the process proceeds to STEP 7 in FIG. 3B.

If it is found in STEP 2 that the -local option is specified, the process proceeds to STEP 3. In STEP 3, user section information (section name) is obtained from the user information DB 31. Users and section information (section names) are stored in the user information DB 31 in association with each other. Since the user has already been authenticated by the master server 1, it can be specified by the use of the authentication information. The section information concerning the section of the user is searched from the user information DB 31.

In STEP 4, the application (section name) of the queue group definition DB 32 is searched for the section name that matches the user section and the application name obtained in STEP 1. Then a list of queues into which a job should be input can be obtained using the section name. For example, if the user is the user of the section X, a list of queue #1 and queue #2 can be obtained.

In STEP 5, the section name is set as the area. The area set in STEP 5 is recorded in STEP 15 in an area field associated with the job name. The same applies to STEP 9 and STEP 12.

In STEP 6, the queue to which a smaller number of jobs are assigned is specified as the queue into which the job is input, from the queues obtained from the queue list.

Figure 3B:
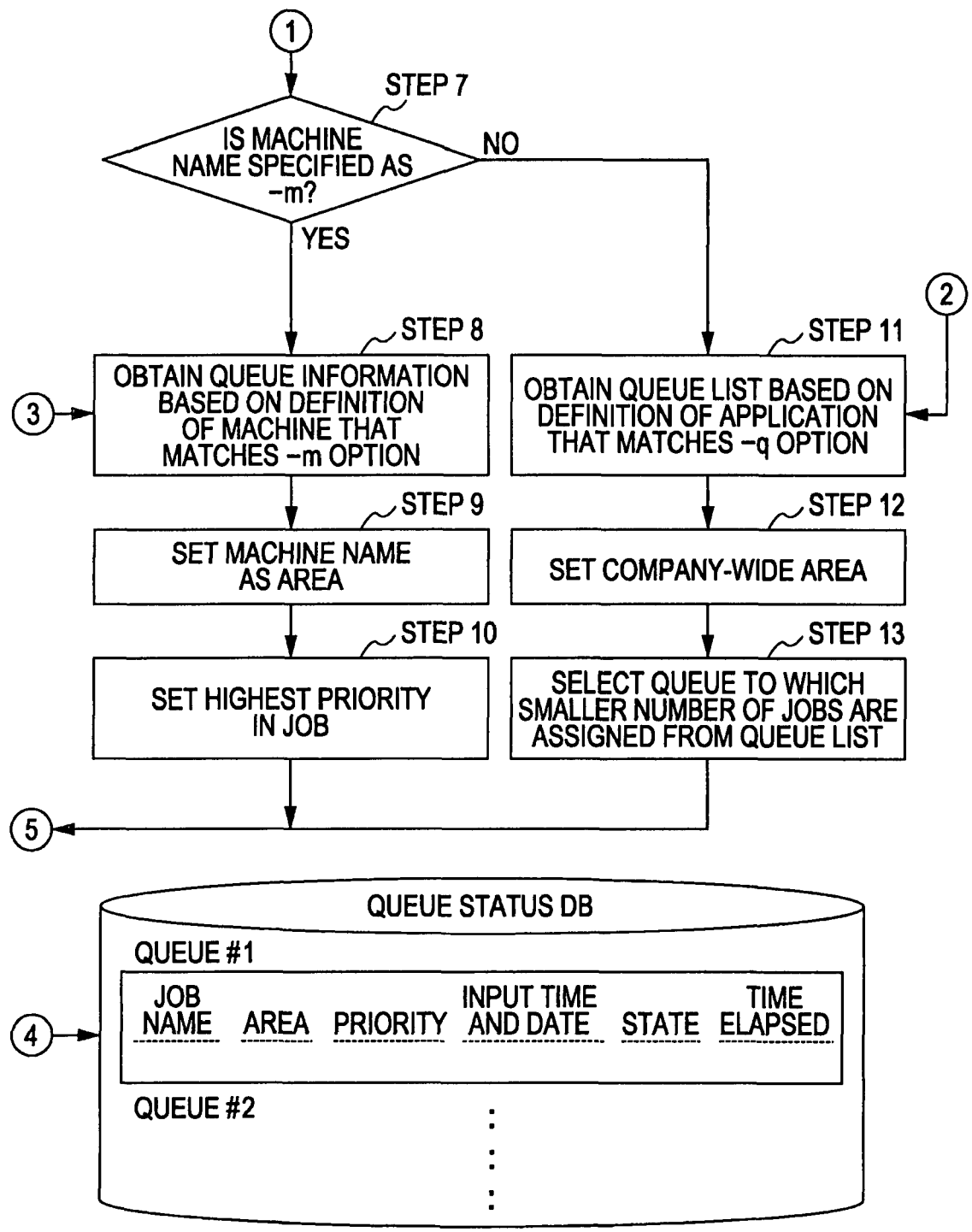

Reference is then made to FIG. 3B. In STEP 7, if it is determined in STEP 2 that the -local option is not specified, the process proceeds to STEP 7 to determine whether the machine name is specified by the -m option. If the machine name is specified, STEP 8 through STEP 10 are executed. If it is found in STEP 7 that the machine name is not specified, STEP 11 through STEP 13 are executed.

In STEP 8, the application (machine name) is searched from the queue group definition DB 32 on the basis of the machine name specified by the -m option and the application name obtained in STEP 1 so that queue information can be obtained.

In STEP 9, the machine name is set as the area.

In STEP 10, a high priority level is set for the job.

The process proceeds to STEP 11 if it is determined in STEP 7 that the machine name is not specified by the -m option. In STEP 11, the applications (company-wide) are searched from the queue group definition DB 32 on the basis of the application name that matches the -q option so that the queue list is obtained.

In STEP 12, the area "company-wide" is set as the area.

In STEP 13, the queue to which a smaller number of jobs are assigned is specified as the queue into which the job is input, from the queues obtained from the queue list.

Referring back to FIG. 3A, in STEP 14, the job is input into the selected queue. The job that is provided with a high priority level in STEP 10 is input into the queue, by interrupting the normal jobs, so that it can be executed earlier than normal jobs.

In STEP 15, the status of the input job is recorded in the queue status DB 33. the area (information set in STEP 5, STEP 9, and STEP 12), the priority level ("intermediate level" is set for normal jobs), and the input time and date are recorded in association with the job name in the queue status DB 33.

The above-described steps are executed every time a job input command is received from a user terminal.

IV. Normal Job Equalizing Function

An example of a process for equalizing the execution order of jobs input into queues is described below with reference to FIGS. 4A through 5C.

Figure 4A:
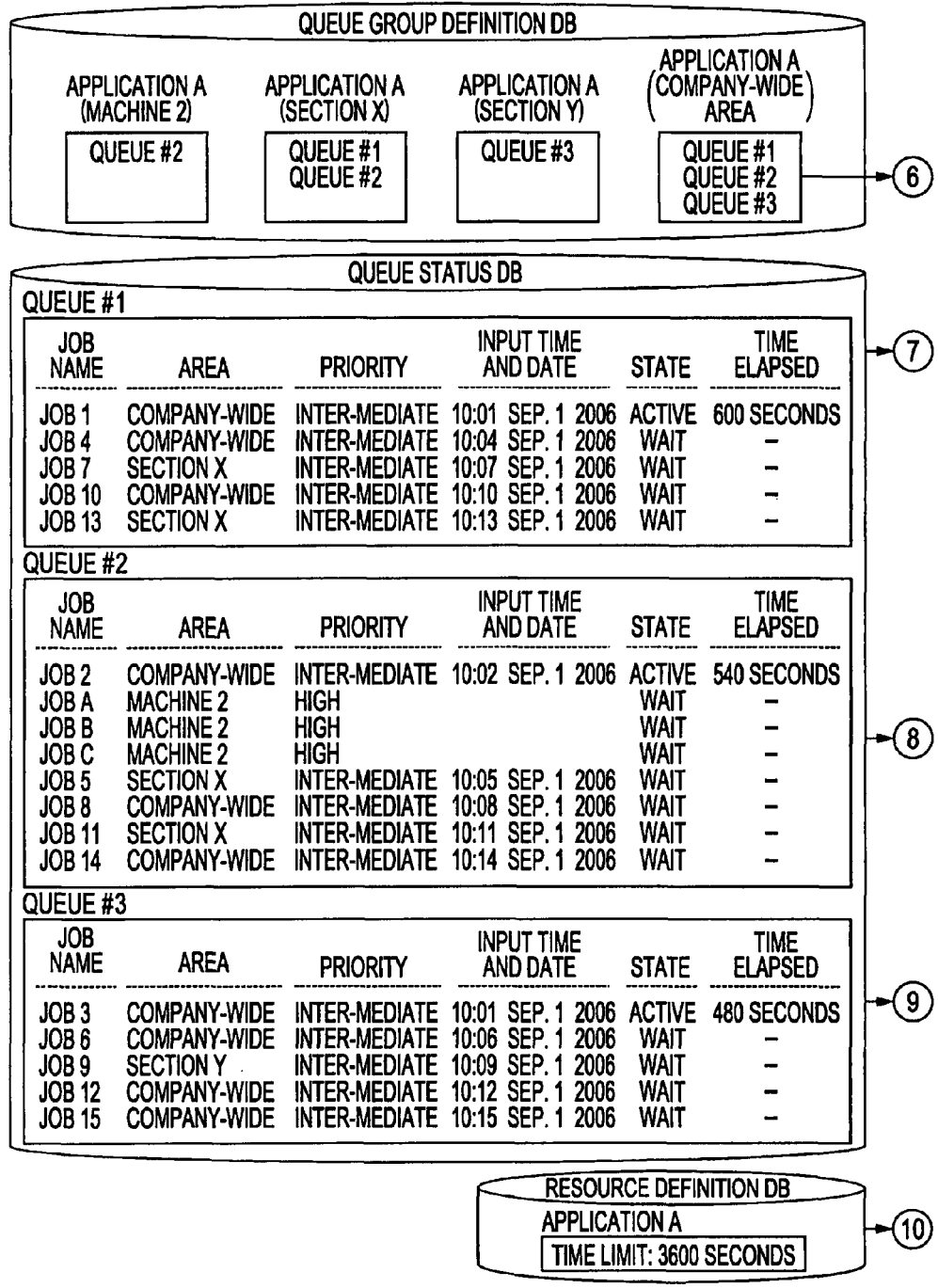
FIGS. 4A through 5C illustrate a normal job equalizing function and normal job equalizing processing by the use of flowcharts.
Figure 4B:
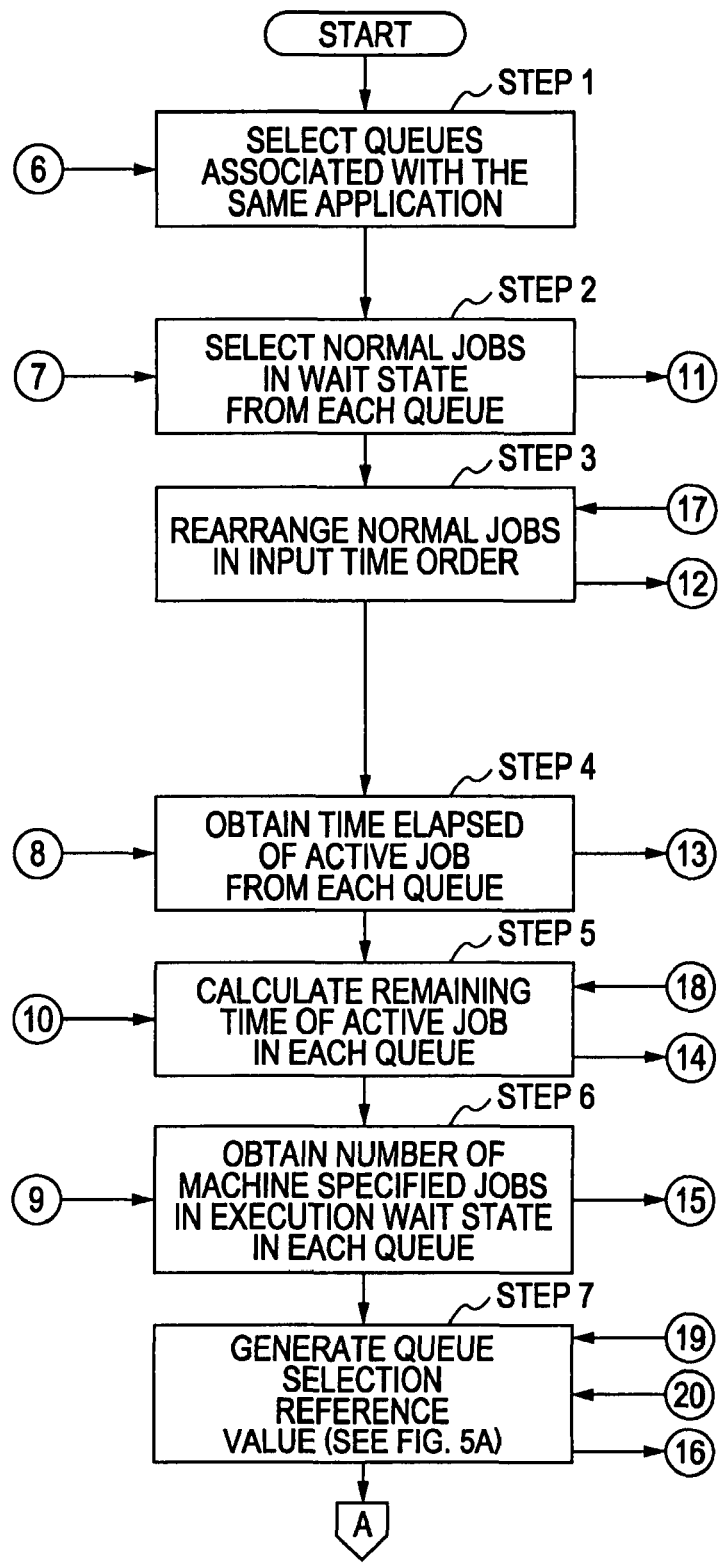

Reference is first made to FIG. 4B. In STEP 1, queues associated with an application to be equalized are selected from the queue group definition DB 32.

In the embodiment shown in FIGS. 4A through 4C, jobs input into the queues associated with the machines that execute application A are equalized, and queues #1, #2, and #3 are selected.

A queue group definition is given for each application in the queue group definition DB 32. Equalizing processing is also executed for queues associated with applications other than application A. For example, if queues #4, #5, and #6 are selected in association with the machine that executes another application B, those queues are selected from the queue group definition DB 32, and equalizing processing similar to the processing described below is performed.

In STEP 2, normal jobs (jobs with an intermediate priority level) in the execution wait state are extracted from each queue by referring to the queue status DB 33, and are recorded in the normal job execution wait list 35.

In STEP 3, the normal jobs recorded in the normal job execution wait list 35 are rearranged in the order of the input time and date, and are recorded in the normal job execution wait input order list 36.

In STEP 4, the time elapsed of a job in execution (active job) is obtained from each queue.

In STEP 5, the remaining time of a job in execution in each queue is calculated. The remaining time of a job in execution in each queue can be calculated by the following equation.

Remaining time of a job in execution (seconds)=execution time limit (seconds)−time elapsed of a job in execution (seconds).

In the resource definition DB 34, the execution time limit within which a machine executes jobs is defined for each application (, only the time limit for application A is shown in FIG. 4A).

In this embodiment, the time limits for individual machines are equal to each other. This is because the processing times performed by the machines #1, #2, and #3 for jobs concerning application A are substantially the same. However, the processing performance of the machine #2 having a large memory capacity is set higher to execute jobs that require large-scale computation.

This embodiment is suitable when the processing time is exactly or almost the same among the machines.

In STEP 6, the number of machine specified jobs in the execution wait state is obtained by checking the area field from the queue status DB 33.

In STEP 7, a queue selection reference value is generated for each queue.

The queue selection reference value is calculated by, for example, the following equation.

Queue selection reference value=remaining time of a job in execution (seconds)+application execution time limit (seconds)×number of machine specified jobs in the execution state.

This equation shows that the time at which all jobs are finished is predicted by considering machine specified jobs that are executed with a high priority level, in addition to the remaining time of a job in execution. Then, the time at which the processing of a normal job can be started is predicted, and the resulting predicted time is set to be the queue selection reference value.

In the example shown in FIG. 4A, a normal job is executed after the execution of the machine specified jobs is finished since three machine specified jobs were input into the queue #2. Accordingly, the value obtained by multiplying the time limit, i.e., 3600 seconds, by the number of jobs, i.e., 3, is added to the remaining time of a job in execution. As a result, 13860 seconds, that is, the predicted time at which the execution of a normal job can be started, is set as the selection reference value for the queue #2.

Figure 5B:
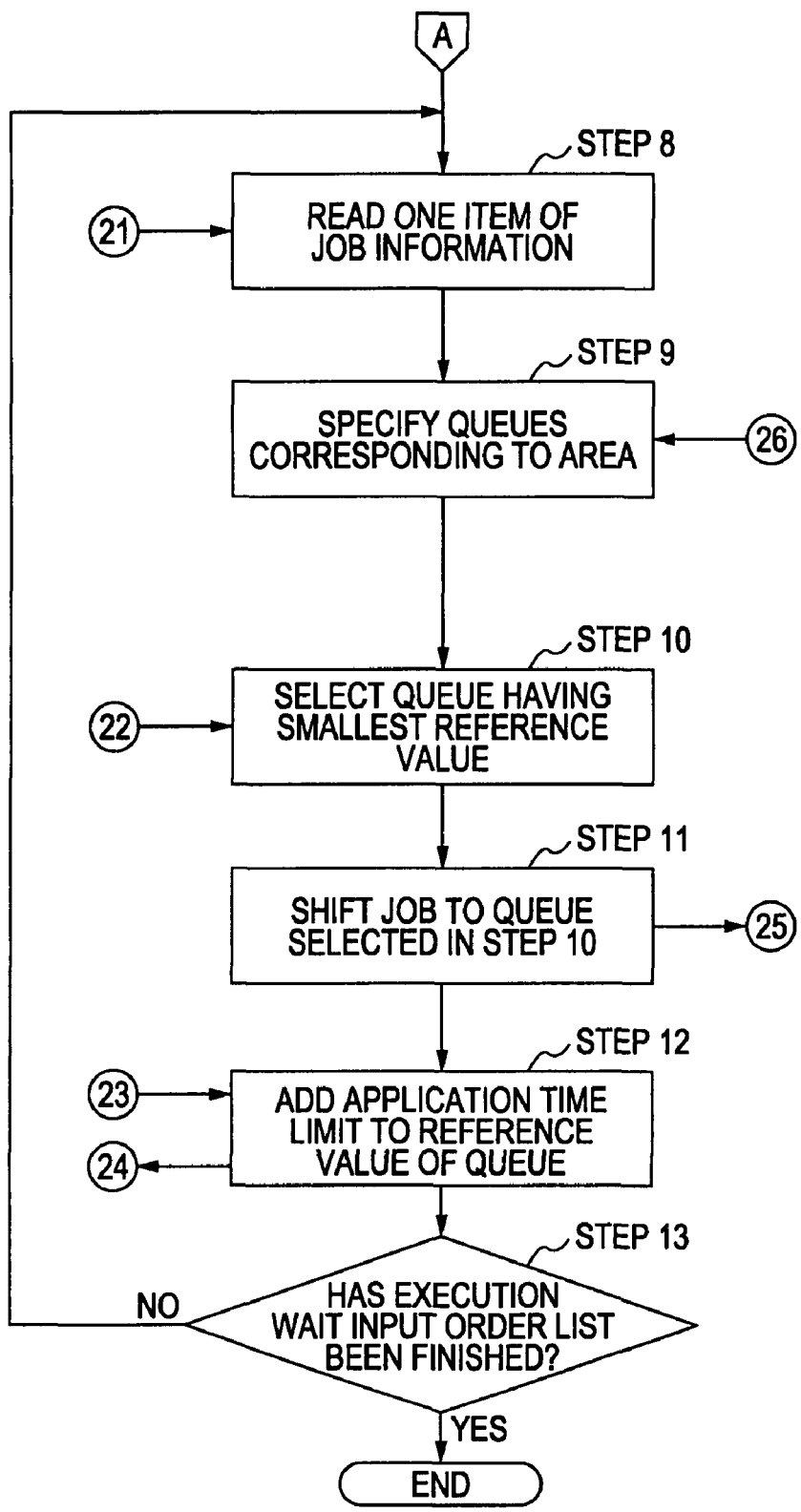
Figure 5C:
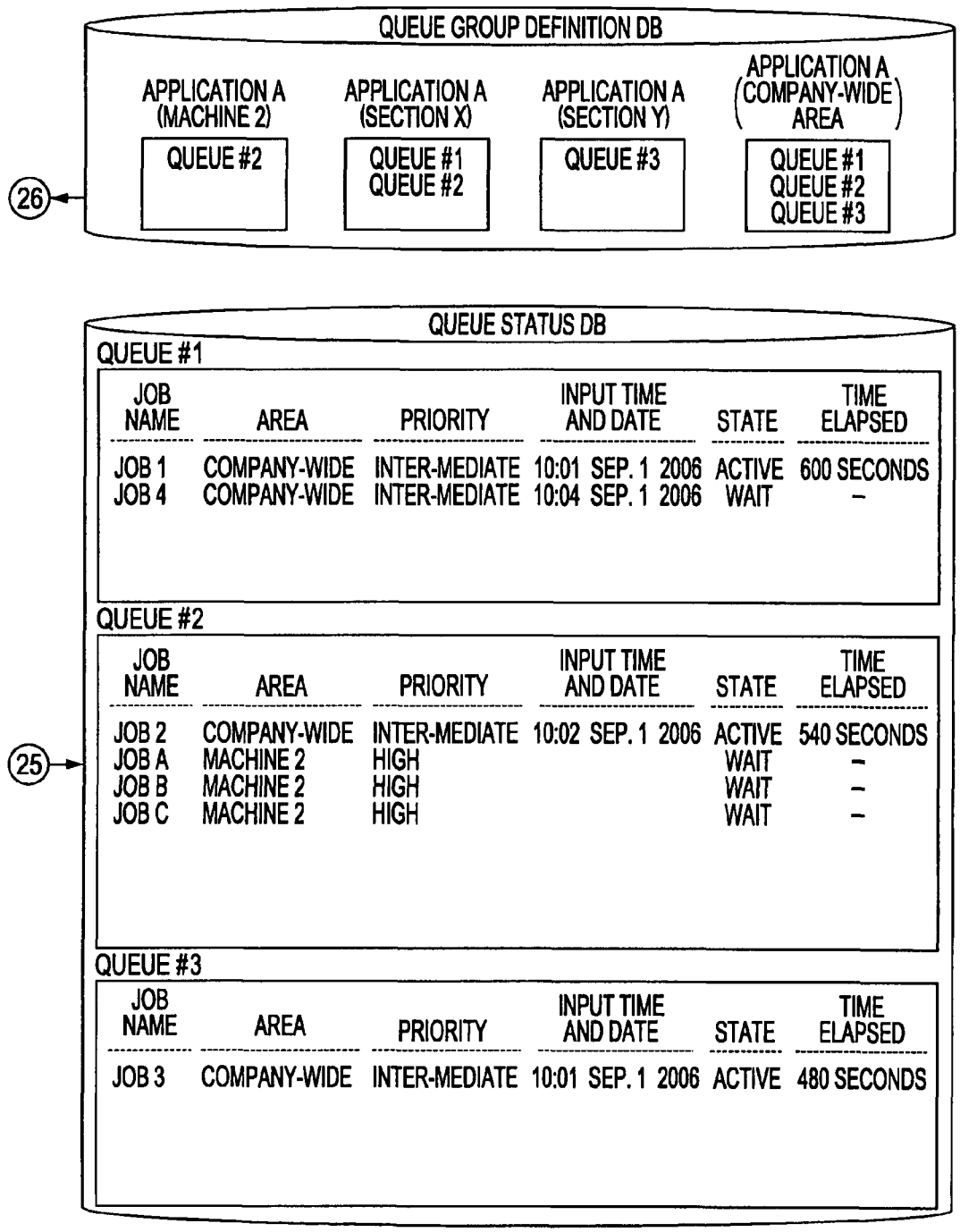

Referring to FIG. 5B, in STEP 8, job information concerning normal jobs recorded in the normal job execution wait input order list 36 are sequentially read in the order of jobs having the earlier input time and date. Then, the equalizing processing indicated in STEP 9 through STEP 12 is executed.

In STEP 9, corresponding queues are extracted on the basis of information "area" contained in the read job information by referring to the queue group definition DB 32. In the example shown in FIG. 5A, for job 4, all the queues (queues #1, #2, and #3) associated with the area "company-wide" are extracted since the area is "company-wide". For job 5, queues #1 and #2 associated with "section X" are extracted, since the area is "section X".

In STEP 10, the queue having the smallest queue selection reference value is selected from the queues extracted in STEP 9. In the example shown in FIG. 5A, queue #1 is selected.

In STEP 11, the job currently subjected to equalizing processing is shifted to the queue selected in STEP 10. STEP 11 is not executed if the selected queue is the queue into which the job is input.

In STEP 12, the application time limit is added to the queue selection reference value for the queue in which the job currently subjected to the equalizing processing is stored (the destination queue if STEP 11 is executed).

In STEP 13, it is determined whether all items of job information in the execution wait input order list 36 have been executed in STEP 8 through STEP 12. The process returns to STEP 8, and STEP 8 through STEP 12 are repeated if there is any item of job information that has not been executed. The processing is completed if it is determined in STEP 13 that all the items of job information have been executed.

V. Specific Example of Equalizing Processing

A specific example of equalizing processing in accordance with the above-described embodiment is described below with reference to FIGS. 6A through 7B.

Figure 6B:
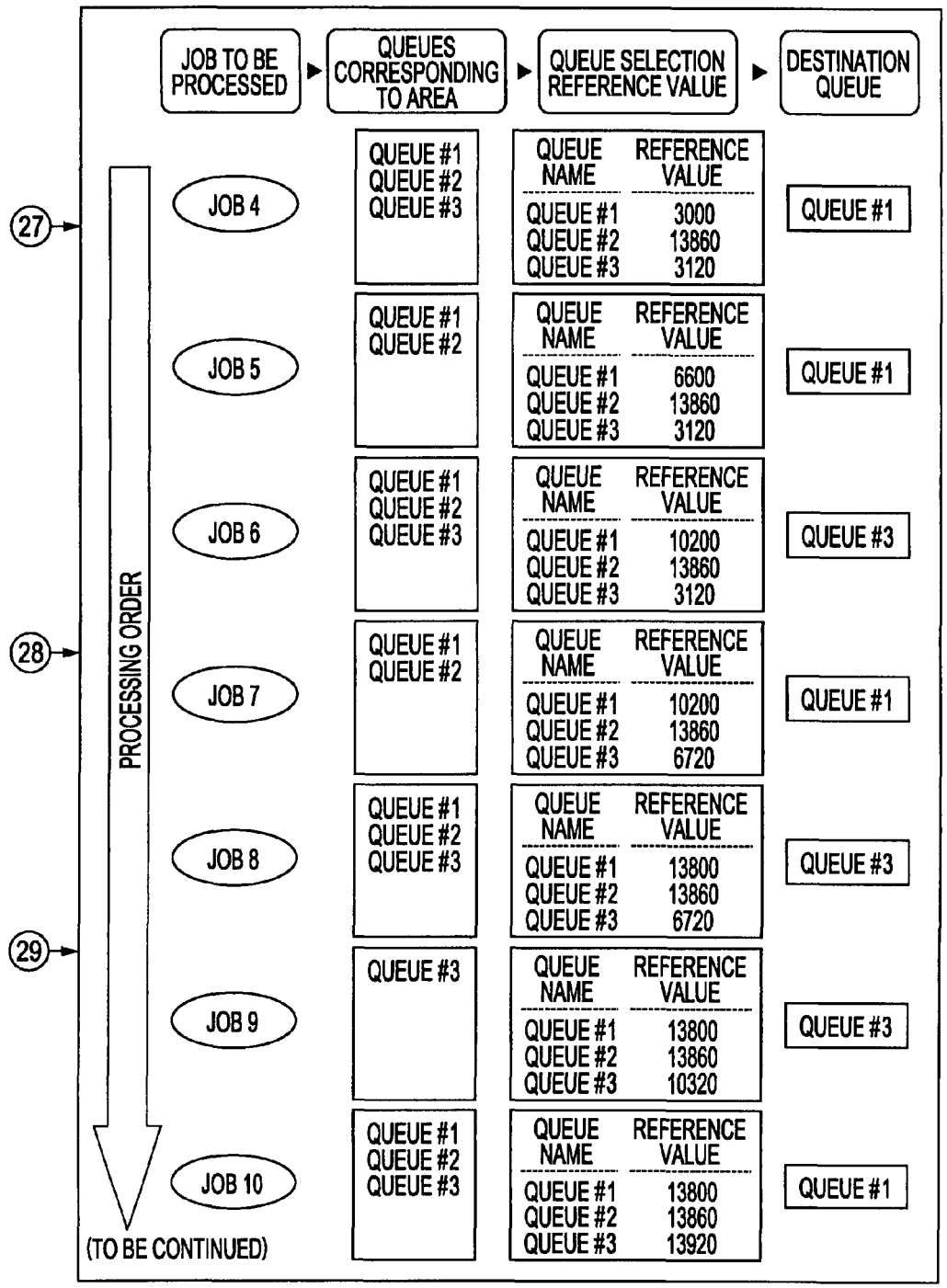
Figure 7B:
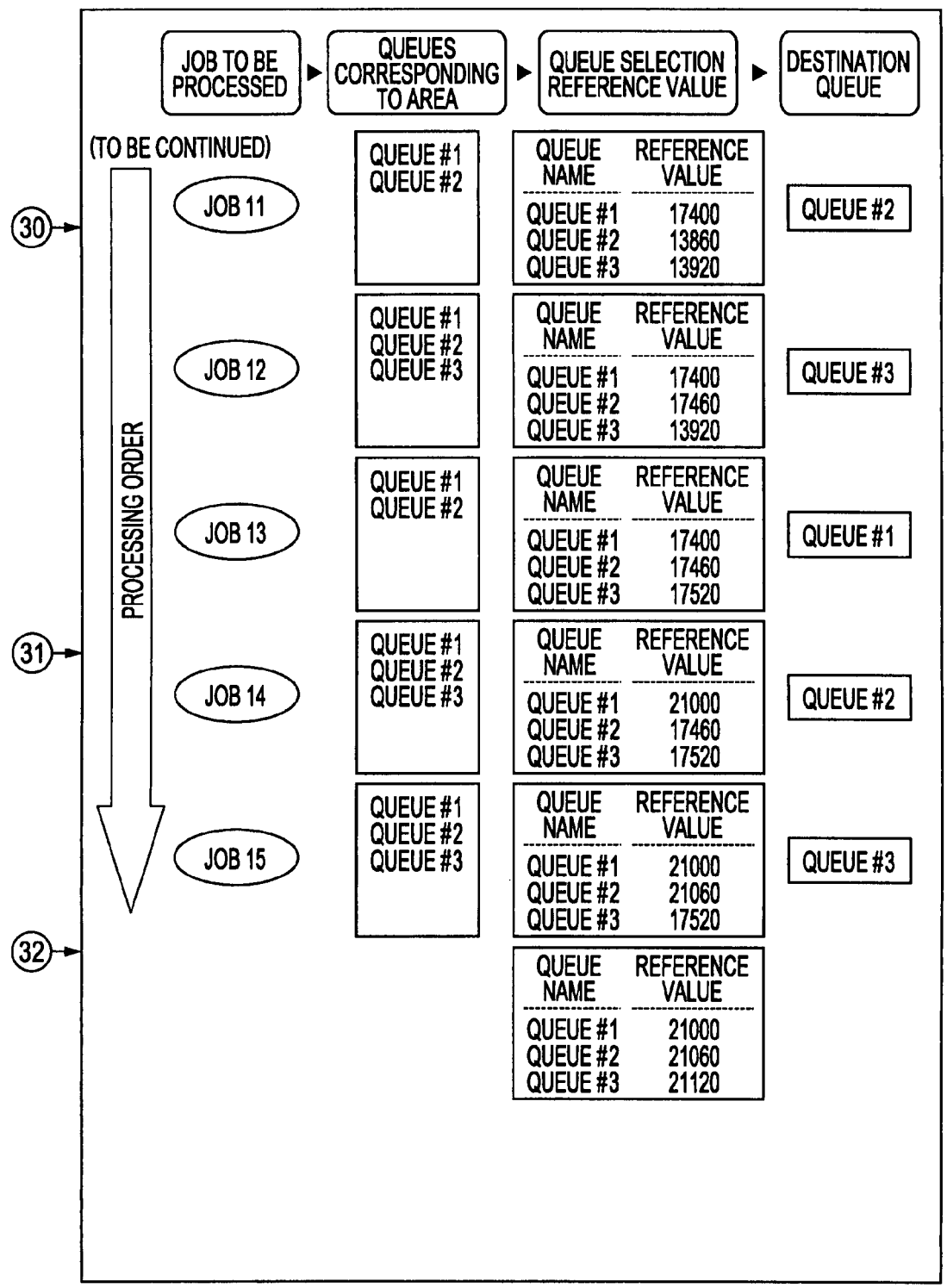

In the example shown in FIGS. 6A and 6B, the job 4 was input at the earliest time of all the normal jobs indicated in the normal job execution wait input order list 36. Accordingly, the job 4 is first subjected to shifting processing (STEP 8 in FIG. 5B).

The area of the job 4 is the area "company-wide". Accordingly, the queue group definition DB 32 shows that all the queues #1, #2, and #3 can be target queues to which the job 4 is shifted (STEP 9 in FIG. 5B).

Thus, the queue #1, which is the queue having the smallest queue selection reference value of the queues #1, #2, and #3, is selected as a destination queue (STEP 10 in FIG. 5B).

However, since the job 4 has already been input into the queue #1, it is not shifted.

Then, the application time limit is added to the queue selection reference value of the selected queue #1 (STEP 12 in FIG. 5B).

Then the job 5 that was input at the second earliest time is selected (STEP 8 in FIG. 5B), since the equalizing processing for the job 4 has been finished (STEP 13 in FIG. 5B).

The area of the job 5 is "section X". Accordingly, the queue group definition DB 32 shows that the queues #1 and #2 can be target queues to which the job 5 is shifted (STEP 9 in FIG. 5B).

Thus, the queue #1, which is the queue having the smaller queue selection reference value of the queues #1 and #2, is selected as the destination queue (STEP 10 in FIG. 5B).

The job 5 is shifted from the queue #2 to the queue #1 (STEP 11 in FIG. 5B).

Then, the application time limit is added to the queue selection reference value of the selected queue #1 (STEP 12 in FIG. 5B).

Then the job 6 that was input at the earlier time after the job 5 is selected (STEP 8 in FIG. 5B), since the equalizing processing for the job 5 has been finished (STEP 13 in FIG. 5B).

Thereafter, STEP 8 through STEP 12 shown in FIG. 5B are executed in the order in which the jobs are input at the earlier time. This can be easily understood with reference to FIGS. 6A through 7B.

The resulting queue status DB 33 after the equalizing processing is shown in FIG. 8.

While the present invention has been described with reference to an exemplary embodiment, it is to be understood that the technical scope of the invention is not limited to the disclosed exemplary embodiment. The scope of the following claims and the summary of the Invention are to be accorded the broadest interpretation so as to encompass all modifications, equivalent structures and functions.

For example, the above-described embodiment of the present invention is applied to a grid computing system. However, it may be applied to another type of distributed system. Additionally, in this embodiment, as information processing apparatuses that execute jobs, machines, such as personal computers, are used. Alternatively, a system including a plurality of information processing apparatuses that are physically implemented on a single computer to execute distributed processing may be used.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A scheduling method for allowing a computer to perform control for inputting jobs into a plurality of queues, one of the plurality of queues being provided for each of a plurality of information processing devices in a distributed processing system, the scheduling method comprising:
    a first step of inputting jobs into each queue by dividing the jobs into high priority jobs which are preferentially processed in each information processing device and normal jobs which do not have to be preferentially processed;
    a second step of calculating a queue selection reference value of each queue, which corresponds to a unit of information processing, on the basis of a predicted time at which processing of a job in execution in each information processing device is finished and a predicted time necessary for executing processing on high priority jobs input into the queue associated with the corresponding information processing device;
    a third step of extracting as a target job, among the normal jobs input into all the queues, a normal job which was input into a corresponding queue at an earliest time;
    a fourth step of shifting the target job to the queue having the smallest queue selection reference value and also of calculating a new queue selection reference value of the queue to which the target job is shifted on the basis of a predicted time necessary for executing processing on the target job; and
    a fifth step of extracting, as a new target job, a normal job which was input into the corresponding queue at a second earliest time after the target job in the fourth step and of executing the fourth step by using the new target job.

2. The scheduling method according to claim 1, wherein the computer includes storage means for storing a queue group definition which defines one or a plurality of queues as a group,
    information for specifying a queue group is added to each of the jobs input in the first step, and
    the fourth step searches the queue group definition on the basis of the information for specifying the queue group, and shifts the target job to the queue having the smallest queue selection reference value among the queues contained in the queue group.

3. A scheduling apparatus for performing control for inputting jobs into a plurality of queues, one of the plurality of queues being provided for each of a plurality of information processing devices in a distributed processing system, the scheduling apparatus comprising:
    a first unit that inputs jobs into each queue by dividing the jobs into high priority jobs which are preferentially processed in each information processing device and normal jobs which do not have to be preferentially processed;
    a second unit that calculates a queue selection reference value of each queue, which corresponds to a unit of information processing, on the basis of a predicted time at which processing of a job in execution in each information processing device is finished and a predicted time necessary for executing processing on high priority jobs input into the queue associated with the corresponding information processing device;
    a third unit that extracts as a target job, among the normal jobs input into all the queues, a normal job which was input into a corresponding queue at an earliest time;
    a fourth unit that shifts the target job to the queue having the smallest queue selection reference value and also of calculating a new queue selection reference value of the queue to which the target job is shifted on the basis of a predicted time necessary for executing processing on the target job; and
    a fifth unit that extracts, as a new target job, a normal job which was input into the corresponding queue at a second earliest time after the target job in the fourth step and of executing the fourth step by using the new target job.

4. The scheduling apparatus according to claim 3, further comprising storage means for storing a queue group definition which defines one or a plurality of queues as a group,
    wherein information for specifying a queue group is added to each of the jobs input in the first unit, and
    the fourth unit searches the queue group definition on the basis of the information for specifying the queue group, and shifts the target job to the queue having the smallest queue selection reference value among the queues contained in the queue group.

5. A non-transitory computer-readable medium storing a scheduling program for allowing a computer to perform control for inputting jobs into a plurality of queues, one of the plurality of queues being provided for each of a plurality of information processing devices in a distributed processing system, the scheduling program, when executed by a processor, performing:
    a first step of inputting jobs into each queue by dividing the jobs into high priority jobs which are preferentially processed in each information processing device and normal jobs which do not have to be preferentially processed;

a second step of calculating a queue selection reference value of each queue, which corresponds to a unit of information processing, on the basis of a predicted time at which processing of a job in execution in each information processing device is finished and a predicted time necessary for executing processing on high priority jobs input into the queue associated with the corresponding information processing device;

a third step of extracting as a target job, among the normal jobs input into all the queues, a normal job which was input into a corresponding queue at an earliest time;

a fourth step of shifting the target job to the queue having the smallest queue selection reference value and also of calculating a new queue selection reference value of the queue to which the target job is shifted on the basis of a predicted time necessary for executing processing on the target job; and a fifth step of extracting, as a new target job, a normal job which was input into the corresponding queue at a second earliest time after the target job in the fourth step and of executing the fourth step by using the new target job.

6. The computer-readable medium according to claim 5, wherein the computer includes storage means for storing a queue group definition which defines one or a plurality of queues as a group, information for specifying a queue group is added to each of the jobs input in the first step, and the fourth step searches the queue group definition on the basis of the information for specifying the queue group, and shifts the target job to the queue having the smallest queue selection reference value among the queues contained in the queue group.

7. A computerized method for scheduling jobs in a queue, comprising:

providing a queue for each of a plurality of information processing devices in a distributed processing system;

dividing the jobs into high priority jobs which are preferentially processed in each information processing device and normal jobs which do not have to be preferentially processed;

calculating a reference value for each queue based on a predicted time at which processing of a job in execution in each information processing device will be finished and a predicted time necessary for executing processing on high priority jobs input into the queue associated with a corresponding information processing device;

selecting a normal job which was input into a corresponding queue at an earliest time as a target job;

shifting the target job to the queue having the smallest queue selection reference value;

calculating a new queue selection reference value of the queue to which the target job is shifted on the basis of a predicted time necessary for executing processing on the target job; and selecting, as a new target job, a normal job which was input into the corresponding queue at a second earliest time after the target job.

* * * * *